United States Patent
Jordi et al.

(10) Patent No.: US 9,382,340 B2
(45) Date of Patent: Jul. 5, 2016

(54) SUSPENSION HOMOPOLYMERIZATION OF AN ISOCYANURATES

(75) Inventors: Howard C. Jordi, Bellingham, MA (US); Mark A. Jordi, Bellingham, MA (US)

(73) Assignee: Jordi Labs, Inc., Mansfield, MA (US)

( * ) Notice: Subject to any disclaimer, the term of this patent is extended or adjusted under 35 U.S.C. 154(b) by 791 days.

(21) Appl. No.: 13/409,104

(22) Filed: Mar. 1, 2012

(65) Prior Publication Data
US 2012/0164452 A1 Jun. 28, 2012

Related U.S. Application Data

(63) Continuation of application No. 12/188,388, filed on Aug. 8, 2008.

(60) Provisional application No. 60/964,012, filed on Aug. 8, 2007.

(51) Int. Cl.

| | |
|---|---|
| C08F 2/18 | (2006.01) |
| B01J 20/26 | (2006.01) |
| B01J 20/28 | (2006.01) |
| B01J 20/285 | (2006.01) |
| C08F 122/10 | (2006.01) |
| C08F 126/06 | (2006.01) |
| C08F 222/10 | (2006.01) |
| C08F 226/06 | (2006.01) |

(52) U.S. Cl.
CPC . *C08F 2/18* (2013.01); *B01J 20/26* (2013.01); *B01J 20/261* (2013.01); *B01J 20/267* (2013.01); *B01J 20/285* (2013.01); *B01J 20/28042* (2013.01); *C08F 122/105* (2013.01); *C08F 126/06* (2013.01); *C08F 222/1006* (2013.01); *C08F 226/06* (2013.01); *B01J 2220/54* (2013.01); *B01J 2220/82* (2013.01); *Y10T 428/2982* (2015.01)

(58) Field of Classification Search
CPC ...... C08F 2/18; C08F 122/105; C08F 126/06; C08F 222/1006; C08F 226/06; B01J 20/26; B01J 20/261; B01J 20/267; B01J 20/28042; B01J 20/285; B01J 2220/54; B01J 2220/82
See application file for complete search history.

(56) References Cited

U.S. PATENT DOCUMENTS

| | | | | |
|---|---|---|---|---|
| 3,267,082 | A * | 8/1966 | De Benneville et al. | 526/259 |
| 3,576,789 | A * | 4/1971 | Kochhar | 428/402 |
| 3,749,684 | A * | 7/1973 | Walker | 521/32 |
| 4,368,275 | A * | 1/1983 | Yanagihara et al. | 521/52 |
| 5,091,086 | A * | 2/1992 | Stengaard | 210/490 |

(Continued)

FOREIGN PATENT DOCUMENTS

JP 59-038649 * 3/1984

OTHER PUBLICATIONS

PTO Translation No. 12-0945 of SU Patent No. 451,715.*

(Continued)

*Primary Examiner* — Duane Smith
(74) *Attorney, Agent, or Firm* — South Shaker Associates; Robert Benson

(57) ABSTRACT

Compositions comprising a cross-linked isocyanurate homopolymer or other cross-linked triazine homopolymers in the form of a microbead that is porous or non-porous; methods of making; and methods of using the compositions are disclosed.

9 Claims, 2 Drawing Sheets

(56) References Cited

U.S. PATENT DOCUMENTS

| | | | |
|---|---|---|---|
| 5,342,593 A * | 8/1994 | Christiansen et al. | 423/242.6 |
| 5,622,681 A * | 4/1997 | Grierson et al. | 423/228 |
| 7,659,348 B2 * | 2/2010 | Muranaka et al. | 525/329.4 |
| 2002/0177522 A1 * | 11/2002 | Alexander et al. | 502/159 |
| 2008/0173583 A1 * | 7/2008 | Boodoo et al. | 210/652 |
| 2008/0230193 A1 * | 9/2008 | Mori et al. | 162/164.1 |
| 2008/0308492 A1 * | 12/2008 | Siegle | 210/508 |
| 2009/0286899 A1 * | 11/2009 | Hofmann et al. | 522/99 |

OTHER PUBLICATIONS

PTO Translation No. 12-0295 of Japan Patent No. 59-038649.*

* cited by examiner

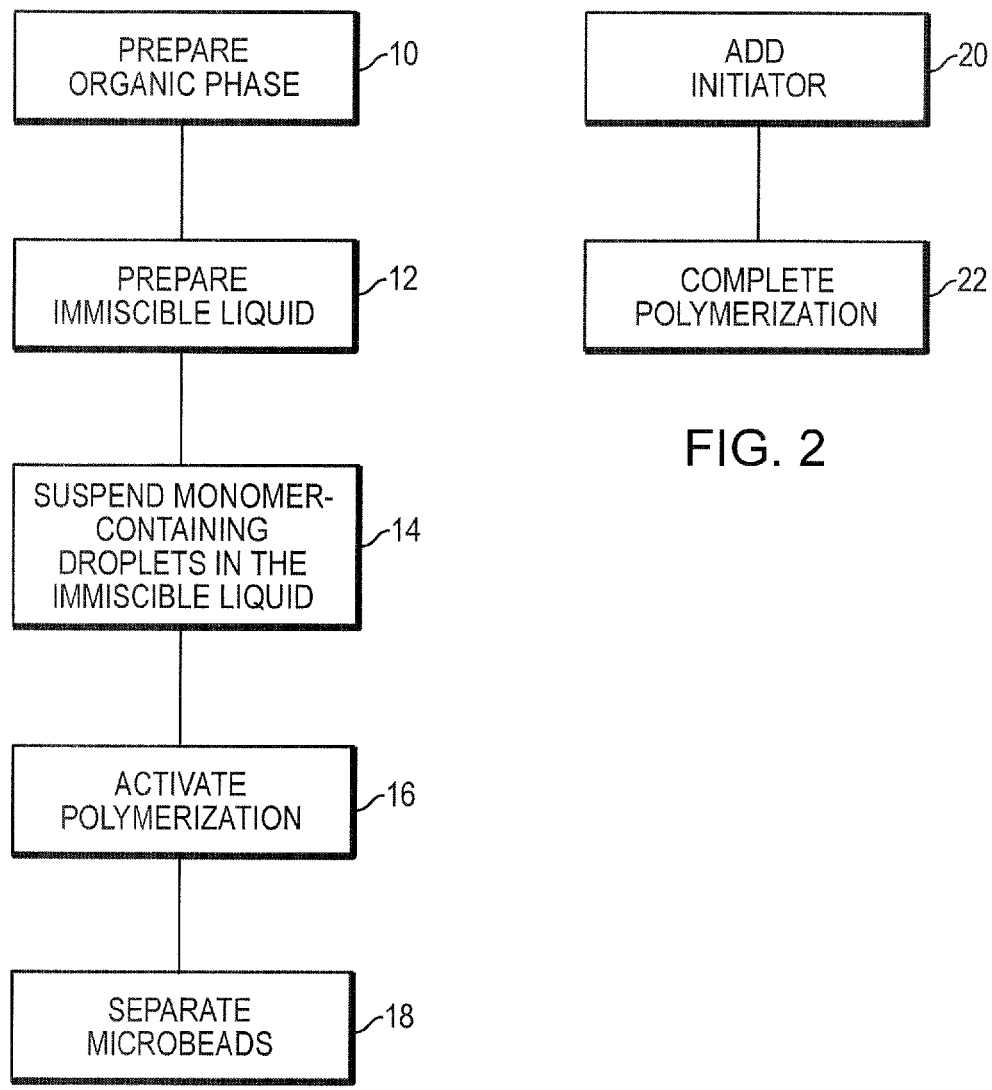

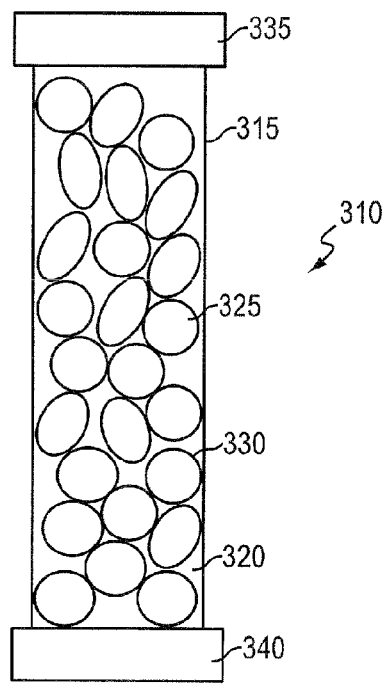
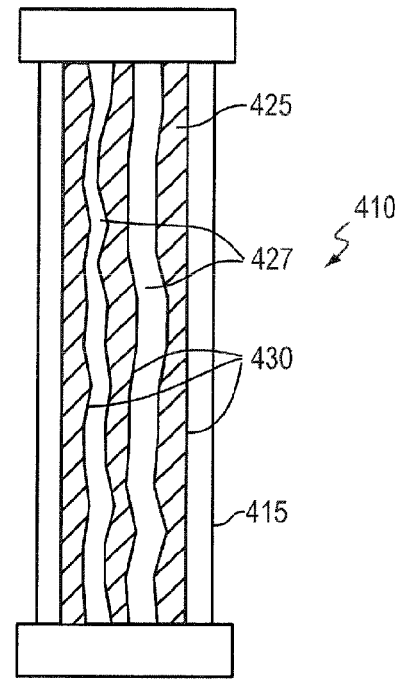
FIG. 3
FIG. 4
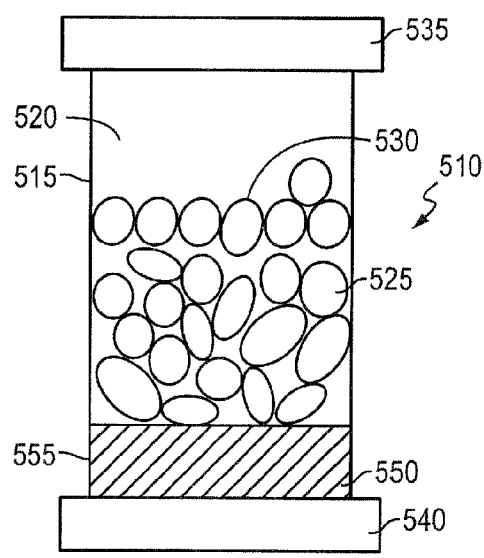
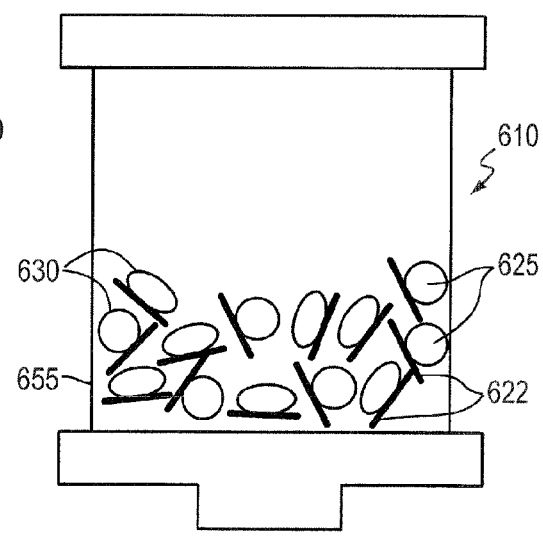
FIG. 5
FIG. 6

SUSPENSION HOMOPOLYMERIZATION OF AN ISOCYANURATES

RELATED APPLICATION

This application is a continuation of co-pending U.S. application Ser. No. 12/188,388, filed on Aug. 8, 2008, of same title, specification, and inventorship, which claims priority from U.S. Provisional Application No. 60/964,012, filed Aug. 8, 2007, of same title and inventorship. The entire teachings of the above applications are incorporated herein by reference.

BACKGROUND OF THE INVENTION

1. Field of the Invention

This invention relates to materials for stationary phases in liquid chromatography.

2. Background Information

"High Performance Liquid Chromatography" (HPLC) is a technique first developed in the 1960s (Poole, C.; Poole, S. *Chromatography Today*, Elsevier, Amsterdam, (1991)) for the separation of a wide variety of analytes that dissolve in solvents. The chromatographic process involves a stationary phase comprising microbeads packed into a separation device, which may include a tube, referred to as a "column", and a mobile phase that is eluted through the column. An injector introduces a sample carried by a solvent into the column, and a detector senses what is eluted from the column. HPLC stationary phases generally comprise either an inorganic or an organic micro spherical support. In order to increase the surface area per gram and the separation efficiencies, the support is generally formed by an oil/water or a water/oil suspension polymerization of liquid microdroplets of monomers into spherical, porous, solid, micron-sized polymer beads or microbeads. The microbeads are either polymers or copolymers, for example, of styrene and divinylbenzene, and are in the form of a gel. The microbeads may have varying degrees of porosity, and may then be further derivatized to provide a specific surface chemistry. The HPLC gel is packed into steel or heavy-walled plastic columns, allowing the application of high pressures used to force the analyte and a solvent through the column at an increased rate.

A liquid pump, capable of providing uniform flow of from about 0.1 milliliters to about 10 milliliters per minute at pressures of up to about 6,000 pounds per square inch (psi) is often utilized.

Several types of HPLC are used. "Gel permeation chromatography" (GPC), also known as "size exclusion chromatography (SEC)", or "gel-filtration chromatography" (GFC), is a method of separation in which molecules are separated based on their size, molecular weight, or molecular weight distribution. In SEC, it is intended that the analyte should not have any enthalpic interactions with the stationary phase. The chemical structure of the polymeric supports used to accomplish SEC has historically been dominated by polystyrene divinylbenzene copolymers. Polystyrene divinylbenzene copolymers have also been used as supports in Reverse Phase chromatography.

"Reverse phase" (RP) is a method of separation based on hydrophobic molecular interactions. In RP, separation is accomplished by the differing hydrophobic affinity of the analyte for the column packing material and for the mobile phase or solvent which passes through the column. RP comprises a whole series of related hydrophobic phases including, for example, $C_{18}$, $C_8$, and $C_4$ bonded to silica, as well as polymeric hydrophobic phases, such as, for example, polydivinylbenzene, polymethylmethacrylate, and polystyrene-polydivinylbenzene copolymers, etc.

"Solid Phase extraction" (SPE) is a method of separation widely used to prepare samples for analysis. Such samples may include, for example, new pharmaceutical compounds, and metabolites in biological fluid matrices such as blood or plasma. Contaminants or other substances such as, for example, proteins in the matrix can interfere with analysis of a compound of interest. In order to determine the concentration of the compound of interest, proteins or other such interfering constituents in the sample can first be removed by using SPE. If the concentration of the compound of interest is high, as the solvent passes through the column, the interfering constituents can be adsorbed by the solid phase while the compound of interest is eluted from the column with the solvent. Alternatively, the compound of interest can be adsorbed by the solid phase while the interfering constituents are washed or eluted through the column. For analysis of complex matrices, both elution strategies can be employed to separate different target analytes.

If the concentration of the compound of interest is too low for detection using any of a variety of analytical detection methods such as mass spectroscopy or ultraviolet detection, with appropriate selection of solvent and solid phase or gel, SPE can also be used to concentrate the compound.

An ongoing problem in the use of SPE is that SPE generally requires a greater difference in selectivity between the compounds to be separated than do other methods of HPLC. In fact, using a currently available solid phase packing material, it has not been possible to prepare some samples for analysis using SPE. This includes compounds which either do not retain on the stationary phase such as some highly water soluble polar drugs or those which cannot be effectively eluted. That is, the currently available solid phase microbeads are inadequate for use in separating the analytes from some samples.

Other common problems in SPE include inadequate resolution of the product from closely related impurities due to incomplete removal of interfering substances from the matrix, and a low rate of recovery of analytes. Further, some samples cannot be prepared for analysis by any currently available HPLC method using available solid phase packing materials. Thus, a need exists for a solid phase polymeric gel that provides a more effective means of separating analytes from a sample.

SUMMARY OF THE INVENTION

The present invention relates to stationary phase compositions comprising a cross-linked homopolymer of which the constituent monomer unit interacts both hydrophobically and hydrophilically with analytes; methods of making the compositions; and analytical methods and apparatus incorporating the compositions.

The present invention relates to compositions comprising a cross-linked isocyanurate homopolymer in the form of a microbead and in the form of a monolith. Other aspects of the invention include methods of preparing, and apparatus and methods for using the microbeads and monoliths provided by the invention.

The crosslinked homopolymers of the invention may be used for separating analytes in aqueous solutions or organic solvents. Other features and advantages will be apparent from the following description of the preferred embodiments thereof, and from the appended claims.

BRIEF DESCRIPTION OF THE DRAWINGS

The invention description below refers to the accompanying drawings, of which:

FIG. 1 is a flow diagram demonstrating steps of an illustrative method of synthesizing homopolymeric isocyanurate microbeads in accordance with the invention;

FIG. 2 is a flow diagram demonstrating steps of an illustrative method of hardening gel microbeads in accordance with the invention;

FIG. 3 depicts a cross section of a chromatographic column embodiment of the invention;

FIG. 4 depicts a cross section of another chromatographic column embodiment of the invention;

FIG. 5 depicts a cross section of a solid-phase extraction cartridge embodiment of the invention; and FIG. 6 depicts a cross section of another solid-phase extraction cartridge embodiment of the invention;

Features in the drawings are not, in general, drawn to scale.

DETAILED DESCRIPTION OF AN ILLUSTRATIVE EMBODIMENT

A detailed description of preferred embodiments of the invention follows. It will be understood that the particular embodiments of the invention are illustrations and not limitations of the invention. First, the invention will be described in its broadest overall characteristics followed by a more detailed description. Further details and additional features of the disclosed compositions and methods will be highlighted in the claims.

The invention relates to cross-linked homopolymer compositions in the form of microbeads; methods of preparation of the compositions; and devices using the compositions. The term "cross-linked", as used herein refers to both partial and complete cross-linking of polymer chains by a grouping that bridges or links two chains. The term "homopolymer" refers to a polymer formed from a single monomer. The disclosed microbeads are useful as the stationary phase of chromatographic-type separations using columns, continuous bed matrices, and single well and multiple well separation devices. Also disclosed is a cross-linked homopolymer composition in the form of a porous, solid bed or monolith, methods of preparation of such compositions; and devices using the compositions.

A homopolymer provided by the invention may have a constituent monomer presenting at least two functional groups that behave sufficiently differently from one another that the homopolymer is capable of interacting with an analyte both hydrophobically and hydrophilically within a single repeating unit. Homopolymerization of such a monomer affords the diverse functionality associated with copolymers without the need for copolymerization reactions or post-polymerization derivitization. Accordingly, the homopolymers of the invention provide a relatively direct and economical synthetic route to versatile chromatographic materials.

The disclosed compositions can be prepared by the suspension homopolymerization of a triazine monomer, for example, an isocyanurate monomer, with a suitable initiator. To those skilled in the art, the term "suspension polymerization" refers to the formation of an oil droplet suspension of the monomer in water and the conversion of liquid microdroplets of monomer into solid microbeads of the polymer. However, in the suspension homopolymerization of the below-listed isocyanurate monomers using a free radical-type initiator, previous attempts by the inventors to harden the gel product and convert it to solid microbeads have resulted in the product bursting into flames. The inventors of the present subject matter have solved that problem, as described in the synthesis route disclosed below.

Examples of Suitable Monomers

A number of triazine monomers are suitable for homopolymerization according to an embodiment of the invention. Non-limiting examples of such triazine monomers include the isocyanurate monomer 1,3,5-triallyl-1,3,5-triazine-2,4,6(1H,3H,5H)-trione having the structural formula:

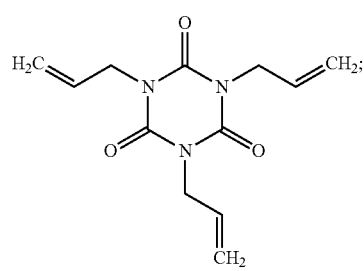

the isocyanurate monomer tris(2-(acryloyloxy)ethyl)isocyanurate having the structural formula:

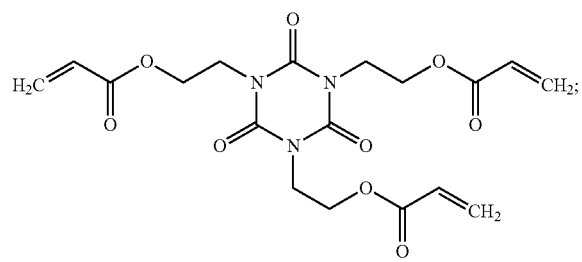 [SMILES: C=CC(=O)OCCn1c(=O)n(CCOC(=O)C=C)c(=O)n(CCOC(=O)C=C)c1=O]

and the isocyanurate monomer tris(2,3-epoxypropyl)isocyanurate having the structural formula

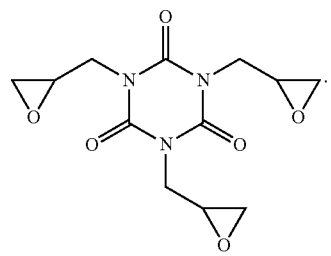 [SMILES: O=c1n(CC2CO2)c(=O)n(CC2CO2)c(=O)n1CC1CO1]

Yet another triazine monomer suitable for homopolymerization according to an embodiment of the invention is the monomer 1,3,5-triacryloylhexahydro-1,3,5-triazine having the structural formula:

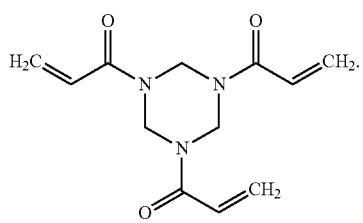 [SMILES: C=CC(=O)N1CN(C(=O)C=C)CN(C(=O)C=C)C1]

After reviewing the method disclosed herein, those of skill in the polymer art will know, or will be able to ascertain with no more than routine experimentation, what other monomers can be used for homopolymerization according to an embodiment of the invention for making a cross-linked isocyanurate homopolymer in the form of a microbead.

Examples of Suitable Initiators

Homopolymerization of a triazine monomer is a chain reaction involving free radicals. As the term is used herein, "radical" has the same meaning as "free radical" and refers to a species possessing one or more unpaired electrons. As the monomers bond to one another, any of a variety of radical generators could most likely serve as an initiator of the disclosed homopolymerization reactions. An initiator that is miscible with a chosen monomer or a solvent dissolving the chosen monomer or that could be dried down onto the surface of the microbeads according to the disclosed method may work well to produce radicals in the vicinity of unreacted vinyl groups in respective steps of the synthesis method of the invention. As the term is used herein, an "initiator", also referred to herein as a "free radical-type initiator", is a reagent that undergoes thermolysis or photolysis to begin the chain-initiating step. A free radical-type initiator such as a peroxide or an aliphatic azo compound, when heated or irradiated, readily forms free radicals.

The prefix "azo" refers to the radical —N=N—. A free radical azo-type initiator can be used in various embodiments of the invention. A non-limiting example of such an initiator is an azobis(alkylnitrile) initiator. An azobis(alkylnitrile) initiator can have the general formula:

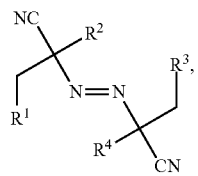

wherein $R^1$, $R^2$, $R^3$, and $R^4$, are the same or different, and are independently chosen from lower alkyl, branched or straight-chain alkyl, optionally substituted with aryl or substituted aryl. As used herein, the term "Lower alkyl" represents a saturated or unsaturated, straight chain, branched, or cyclic group comprising one to about 10 carbon atoms.

Alkyl is intended to include linear, branched, or cyclic hydrocarbon structures and combinations thereof. Cycloalkyl is a subset of alkyl and includes cyclic hydrocarbon groups, in this case preferably from 6 to 8 carbon atoms. The compounds described herein may contain one or more asymmetric centers and may thus give rise to enantiomers, diastereomers, and other stereoisomeric forms that may be defined, in terms of absolute stereochemistry, as (R)— or (S)—. The present invention is meant to include all such possible isomers, as well as, their racemic and optically pure forms.

In one embodiment of the invention, the azobis(alkylnitrile) initiator is 2,2'-azobis(2-methylbutyronitrile) having the formula:

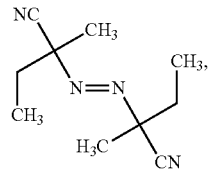

commercially available as VAZO-67™ (Dow Chemical Company). The CAS registry number of 2,2'-azobis(2-methylbutyronitrile) is 13472-08-7.

Other examples of azobis(alkylnitrile) initiators include azodiisobutyronitrile (VAZO-64™ Dow Chemical), azodiisovaleronitrile (VAZO-52™ Dow Chemical), and 2,2'-azobis (isobutyronitrile).

Yet other examples of suitable free radical azo-type initiators are dimethylazodiisobutyrate, 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramidine), 1,1'-azobis(1-cyclohexanecarbo-nitrile), 4,4'-azobis(4-cyanopentanoic acid), 2,2'-azobis(isobutyramide)dihydrate, and 2,2'-azobis (2-methylpropane).

Yet other monomer-soluble initiators can be used. Any of various water-insoluble free radical initiators, particularly the solid initiators, can be employed as the initiator in the disclosed process. Other non-limiting examples of suitable initiators include compounds 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramidine), 1,1'-azobis(1-cyclohexanecarbo-nitrile), 4,4'-azobis(4-cyanopentanoic acid), 2,2'-azobis(isobutyramide)dihydrate, 2,2'-azobis(2-methylpropane), peroxybenzoic acid, cyanopentanoic acid, the peroxy-pivalates, dodecylbenzene peroxide, benzoyl peroxide, di-t-butyl hydroperoxide, t-butyl peracetate, acetyl peroxide, dicumyl peroxide, cumyl hydroperoxide, dimethyl bis(butylperoxy)hexane, potassium persulfate, ammonium persulfate, and potassium hydrogen persulfate.

Methods of Synthesis

A triazine is a compound with six atoms, including three nitrogen atoms, in a ring. No examples of cross-linked homopolymer microbeads produced from a triazine monomer, for example, an isocyanurate and useful in the stationary phase of chromatographic devices could be found in the literature. This may be a result of the lack of a clear synthetic route to producing these materials. The inventors made many attempts to produce such a cross-linked homopolymer microbead from an isocyanurate monomer. For example, previous attempts by the inventors to produce a triallylisocyanurate homoploymer using a free radical type initiator resulted in a product having a soft, "muddy" or "pudding-like" consistency. The attempts tended to yield a low molecular weight homopolymer, a homopolymer product that does not harden into microbeads suitable for use in chromatography. Instead of hardening, the triallylisocyanurate homoploymer bursts into flames during attempts to dry it. The inventors have now solved this problem by discovering a method of preparing cross-linked homopolymers of isocyanurates in the form of finished microbeads. During one embodiment of the disclosed process, intermediate, unfinished homopolymer microbeads have a coating of initiator present on the total surface of the unfinished microbeads. In a subsequent step of the process, the initiator coating decomposes without undergoing combustion. The disclosed method of drying the unfinished microbeads yields a cross-linked isocyanurate homopolymer in the form of microbeads without the coating of the initiator.

In general, the disclosed cross-linked homopolymer compositions may be prepared by the methods illustrated in the general reaction schemes as, for example, described below, or, with no more than routine experimentation, by modifications thereof, using readily available starting materials, reagents and conventional synthesis procedures. In these reactions, it is also possible to make use of variants that are in themselves known, but are not mentioned here.

General principles of oil-in-water suspension polymerization techniques are known. The suspension in water of an oil droplet containing the monomer is maintained throughout the polymerization. Controlling the speed of mechanical stirring and controlling the volume ratio of the aqueous phase to the organic phase are both important in maintaining stable oil droplets.

In order to reduce surface tension of the aqueous phase in such techniques, a suspension promoter, such as a water-soluble suspension agent or coagulation inhibitor, may be used. We used methylcellulose, a cellulose ether polymer, commercially available as METHOCEL™ (Dow Chemical). Ammonium hydroxide was found to help stabilize the methylcellulose in the aqueous phase. Non-limiting examples of other water-soluble suspension agents suitable for use in an embodiment of the invention include polyvinyl alcohols, preferably from about 75 percent to about 98 percent hydrolyzed, polyvinylpyrrolidone, gelatin, other natural gums, and blends of the foregoing. A water-insoluble inorganic salt that is substantially insoluble in the monomer droplets and that has relatively low solubility in the suspension medium may also be suitable for use as a suspension promoter in the disclosed method. Non-limiting examples of inorganic suspension agents suitable for use in the disclosed method include calcium sulfate, calcium phosphate, benzonite, and blends of the foregoing. A concentration of the coagulation inhibitor needed to maintain a stable suspension system with constant stirring can be determined with no more than routine experimentation. Generally, the minimum stabilization concentration of the coagulation inhibitor needed is from about 0.15 percent to about 1 percent by weight of the suspension, with the higher end of the range needed as the desired particle size decreases.

With reference to FIG. 1, an isocyanurate microbead synthesis compatible with embodiments of the invention may include preparation of an organic phase containing isocyanurate monomer (step 10); preparation of an immiscible liquid (step 12); suspending droplets of the organic phase in the immiscible liquid (14); activating polymerization of the isocyanurate monomer in the droplets (step 16); and separating the microbeads from the suspension (step 18). The resulting particles may then be collected and purified and then further reacted using a hardening procedure to prepare beads which are suitable for chromatographic applications.

The process of suspension polymerization to prepare the microbeads of the invention is illustratively done in several steps, over a period of from about 2 days to about 3 days. On the first day, steps 10 and 12 may be performed. In one embodiment of the invention, the organic phase prepared in step 10 comprises the 1,3,5-triallyl-1,3,5-triazine-2,4,6 (1H, 3H,5H)-trione monomer, an optional first free radical-type initiator, and optionally, at least one hydrophobic porogen. As the term is used herein, a "porogen", sometimes referred to as a "porogenic agent", is an added material that increases the porosity of a microbead, creating "pores" within the microbead. A porogen suitable for use in an embodiment of the invention may be a liquid solvent such as an alcohol or it can be a finely divided solid, e.g., calcium carbonate that can be removed by reaction with an acid or base. The hydrophobic liquid porogen may consist essentially of a pair of solvents chosen from: toluene and dodecanol in a volume ratio of approximately 1:1; dodecanol and cyclohexane in a volume ratio of approximately 1:1; dodecanol and cyclohexane in a volume ratio of approximately 3:1; dodecanol and cyclohexane in a volume ratio of approximately five and two-thirds to one, or 5.67:1. The volume of the monomer and the total volume of the pair of solvents may be in a ratio of approximately 1:1.

The immiscible liquid prepared in step 12 is immiscible with the organic phase. Illustratively, the immiscible liquid is an aqueous phase comprising deionized water and a water-soluble coagulation inhibitor or suspension agent. Alternatively, the immiscible liquid is based on a nonaqueous solvent. In step 12, the aqueous phase may be started with hot water to wet the suspension agent, ambient-temperature water then being added to dissolve the suspension agent, so that the temperature of the aqueous phase may be at about room temperature before mixing with the organic phase. The immiscible liquid optionally includes other ingredients, for example a salt such as potassium dichromate that helps moderate the function of the initiator during polymerization.

In step 14 of the synthesis of a cross-linked triazine homopolymer, e.g., a cross-linked isocyanurate homopolymer, in the form of a microbead, droplets of the organic phase are suspended in the immiscible liquid. Illustratively, the immiscible liquid is mixed together with the organic phase with constant, high-speed stirring, such as at, e.g., 200 revolutions per minute ("rpm") to 350 rpm, for a period of time sufficient to allow formation of a plurality of suspended organic droplets of a pre-determined, desired size range chosen to produce a desired microbead size range. As used herein, the term "suspension" refers to the droplets in the immiscible liquid before and after they have polymerized to form microbeads.

In step 16, polymerization of the isocyanurate monomer in the droplets is activated. The term "activate" as used herein with respect to polymerization encompasses activities that advance the degree of bonding between monomeric units, whether the bonds form along or between polymeric chains, and whether the bonding occurs in the suspended droplets of organic phase or occurs in discrete gel or solid particles such as microbeads.

In one approach, the organic phase comprises a first initiator before step 14. The first initiator initiates polymerization of the monomer, producing homopolymeric particles. For example, the initiator-containing droplets may be agitated with relatively low-speed stirring, e.g., about 50 to 100 rpm, under conditions conducive to polymerization of the isocyanurate monomer, typically about 70 degrees Celsius, for a time period sufficient to allow a desired degree of polymerization of the isocyanurate monomer in the suspension, typically about 12 hours. While stirring, if necessary for a desirable rate of polymerization, step 16 may further include adding a second free radical-type initiator to the suspension. Adding the second initiator may be effected by adding a supplemental dose of the first initiator optionally present in the organic phase or by adding an initiator distinct from the first initiator.

In another approach, the organic phase comprises no initiator before step 14, and an initiator is first provided to the monomer in the organic phase after suspending the droplets. After the addition of the initiator to the suspension, the droplets may be maintained under conditions conducive to polymerization of the monomer, as described above.

To facilitate separation step 18, an acid may first be added to the suspension to facilitate removal of the suspension promoter from the microbeads. This auxiliary process may be done on day two. In one approach, the acid may be added to the polymerized suspension containing cross-linked homopolymeric isocyanurate microbeads to form an acidified mixture. For example, on the second day an acid such as nitric acid may be combined with an alcohol such as methanol and then mixed with the suspension. The mixing illustratively continues at a gentle stir speed, typically from about 50 rpm to about 100 rpm, for a period of several hours, for example from about 5 hours to about 30 hours, typically for about 24 hours, with heating in a water bath at about 70 degrees Celsius. In another approach, the acid may be added to the microbeads after step 18.

In step 18, which may be done the following day, the polymerized droplets are illustratively filtered from the suspension, thereby separating cross-linked isocyanurate homopolymeric microbeads. Such filtration may be straightforwardly done as a vacuum filtration through a fine gauge Buchner funnel. The separated microbeads may optionally be washed with an organic solvent, which may be miscible with water, e.g., acetone, and filtered again, thereby obtaining a washed residue comprising the cross-linked isocyanurate homopolymer in the form of microbeads. The microbeads formed may be, at this time, in a relatively hard physical state, and useful in chromatographic applications. For example, the homopolymer of the isocyanurate monomer, tris(2-(acryloyloxy)ethyl)isocyanurate having the structural formula:

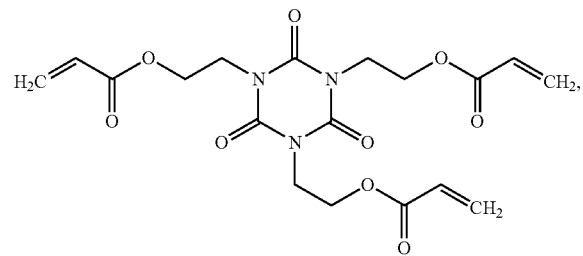 [SMILES: C=CC(=O)OCCn1c(=O)n(CCOC(=O)C=C)c(=O)n(CCOC(=O)C=C)c1=O]

is in the form of finished, hardened microbeads after step 16 of the process, and does not require further polymerization to be useful.

On the other hand, the homopolymer of the isocyanurate monomer, 1,3,5-triallyl-1,3,5-triazine-2,4,6 (1H,3H,5H)-trione having the structural formula:

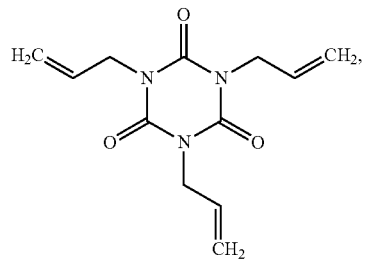 [SMILES: C=CCn1c(=O)n(CC=C)c(=O)n(CC=C)c1=O]

is in the form of soft, deformable, gel microbeads after step 16 and does require further finishing to be useful in high pressure liquid chromatography. The following steps may be needed to harden the microbeads, the steps preventing combustion of the microbeads during the drying process.

With reference to FIG. 2, a method for hardening isocyanurate gel microbeads compatible with embodiments of the invention may include adding initiator to the microbeads (step 20) and completing polymerization of the microbeads (step 22).

In step 20, additional initiator is provided to gel microbeads separated in step 18. In one approach, the initiator provided may be the same initiator provided to the monomer earlier in the microbead synthesis, for example during step 16 of the synthesis. In another approach, the initiator added in step 20 is a different initiator from any initiator previously added to the microbeads. Step 20 is illustratively performed by combining a free radical-type initiator with a solvent, for example a water-soluble organic solvent, and stirring the gel microbeads together with the combination. Then, the solvent is removed to leave microbeads coated with the added initiator. Removal of the solvent is illustratively performed by evaporating the solvent in a fume hood, with gentle stirring. As the solvent evaporates, the added initiator coats substantially the total surface of the unfinished separated isocyanurate homopolymer microbeads, thereby forming unfinished, coated isocyanurate homopolymer microbeads. As the term is used herein, the "total surface" of the unfinished isocyanurate homopolymer microbeads, also referred to herein as "microbeads," includes the surface of any pores in the microbeads and the outer surface of the microbeads. A pore of a microbead is a cavity, opening, or fenestration in the surface of the microbead. The pore of a microbead projects or extends from the surface of the microbead into the interior of the microbead. The pore may be confluently joined by interconnecting pores that may be present within the interior of the microbead. In both finished and unfinished porous microbeads, there exists, as described in the art, a "tortured network of pores."

Several different organic solvents miscible with water may be useful for both washing the gel in step 18 and for combining with the additional free radical initiator in step 20. Examples of such solvents include at least one of a $C_1$ to $C_6$ alcohol, a ketone, an ester, methylene chloride, and combinations thereof. In an illustrative embodiment of the method of the invention, the solvent that is used in both of these steps is acetone.

In step 22, the polymerization of isocyanurate in the microbeads continues to substantial completion, thereby hardening the microbeads. Illustratively, the unfinished, coated isocyanurate homopolymer microbeads are maintained in a substantially oxygen-free environment, at a suitable temperature and for a period of time sufficient for the free radical-type initiator to decompose and the unfinished, coated, isocyanurate homopolymer microbeads to further polymerize, yielding finished cross-linked isocyanurate homopolymer microbeads. In particular, step 22 may be accomplished by drying the unfinished microbeads in a vacuum oven that substantially excludes air. During the drying or hardening process, it is important to maintain the coated gel microbeads in a partial vacuum, substantially excluding air, at a temperature, for example, from about 55 degrees Celsius to about 80 degrees Celsius, or preferably from about 70 degrees Celsius to about 75 degrees Celsius, for a period of from about 5 hours to about 12 hours, or overnight. During this period, the gel hardens to finish the microbeads, thereby forming the cross-linked isocyanurate homopolymer in the form of a microbead. The hardened microbead may be porous or non-porous.

Because of the cross-linking, there may be no simple repeat unit in the homopolymer. Additionally, there is the possibility of eight-membered rings forming, if a propagating radical adds to an allyl chain on the same monomer unit. A significant amount of chain transfer to monomer is expected because the propagating radical is not well stabilized. This would result in shorter chains, ending, for example, with $CH_3$.

The Microbeads

The microbeads according to various embodiments of the invention are homopolymeric particles that are substantially spherical, substantially ellipsoidal, irregular in shape, or a combination thereof. A "microbead", as the term is used herein, refers to a polymer particle having a bead-shaped morphology.

Assuming that the microbeads have a substantially spherical shape, the microbeads of the invention generally have an average diameter of from about 0.5 microns to about 200 microns, or from about 1 micron to about 100 microns. In one embodiment, the diameters of the microbeads are non-uniform.

The outer surface of the disclosed microbead has a structure that is non-porous or porous. The total surface of the cross-linked isocyanurate homopolymer microbead is understood to include the surface of the pores in the microbead. The microbeads may have varying degrees of porosity. "Porosity", as used herein, is the ratio of the volume of a particle's interstices, pores, or channels to the volume of the particle's mass. The diameter or size of the pores on the surface of the microbeads of the invention varies. "Size of the pores", or "pore size" as the terms are used herein, refers to the average diameter of the pores. The pores are believed to be non-uniform in diameter throughout their length. Some of the pores completely penetrate the microbead. In one embodiment of the invention, the outer surface of the microbead has a structure that is porous and wherein the average diameter of a pore is from about 1 angstrom to about $10^5$ angstroms.

The Homopolymeric Monolith

In yet another embodiment of the invention, a cross-linked isocyanurate homopolymer is in the form of a monolith, that is, a solid bed, porous structure. The homopolymerization is carried out in situ within the confines of the chromatographic device to be used for analyzing a sample. A method of preparing the disclosed monolith comprises preparing the organic phase, comprising an isocyanurate monomer, a free radical-type initiator, and at least one hydrophobic porogen, as described above.

Pour the organic phase into a column, well, cartridge, or other type of reservoir. It is desirable to purge the reservoir with nitrogen and close with a suitable cap or stopper. Allow the suspension to homopolymerize under suitable conditions of temperature within the reservoir for a period of time sufficient to form a monolith comprising a solid bed, porous network structure within the reservoir. The reservoir acts as a mold. Clean the monolith with solvents to substantially eliminate the initiator and suspension agent.

Uses and Other Aspects

In another aspect, the invention provides a device for extraction or separation of a component of a mixture, the device comprising the disclosed microbeads or the disclosed monoliths. The invention provides a stationary phase of cross-linked homopolymer microbeads and monoliths useful, for example, in reverse phase, gel permeation and size exclusion chromatography to separate analytes by molecular mass, various interactions such as (vanderwaals forces, dipole-dipole interactions or hydrogen bonding) or to remove contaminants. The microbeads thus prepared have been used for, e.g., the molecular weight determination of various dextrin polymers in water as well as nylon 6,6 and polyethyleneterphthalate in hexafluoroisopropanol. Benefits of the cross-linked isocyanurate polymers of the invention include, e.g., broad solvent compatibility and high pH stability for gel permeation chromatography analyses.

The invention also relates to microbeads used as novel polymeric thin layers or membranes, plates, monoliths and the like. As the term is used herein, a "monolith" is a continuous bed or a porous rod. An example of a polymeric membrane suitable for use in an embodiment of the invention may be from about 10 micrometers to about 100 micrometers in thickness. The term "polymeric sheet" generally refers to a sample of a polymer that is thicker than a polymeric thin layer membrane.

Another aspect of the invention relate to a method for separating and analyzing a component of a mixture comprising an analyte sample, the method comprising: a) packing a liquid chromatography column having an open interior with a stationary phase comprising a cross-linked isocyanurate homopolymer in the form of a microbead, or homopolymerizing an isocyanurate monomer within the liquid chromatography column to form a cross-linked isocyanurate homopolymer in the form of a continuous rod; b) introducing the analyte sample and a solvent to the liquid chromatography column; c) applying a vacuum or pressure to the liquid chromatography column; d) allowing the solvent to diffuse through the column; and e) monitoring the eluent with a detector; thereby separating a component of the analyte sample by its molecular weight or by its affinity for the stationary phase.

With reference to FIG. 3, an illustrative embodiment of the invention comprises a chromatographic column 310 having a wall 315 and an interior 320. The wall 315 encloses homopolymeric isocyanurate microbeads 325. The microbeads 325 bear a cross-linked homopolymeric isocyanurate surface 330 adapted to separate an analyte from a mixture passed through the column 310. The column 310 has fittings 335 and 340 for joining the interior 320 with a fluid train for delivering the mixture and receiving eluent during operation.

With reference to FIG. 4, another illustrative embodiment of the invention comprises a chromatographic column 410 having a wall 415 enclosing a monolith 425 having pores 427 and bearing a cross-linked homopolymeric isocyanurate surface 430.

With reference to FIG. 5, another illustrative embodiment of the invention comprises a solid-phase extraction cartridge 510. The cartridge 510 contains homopolymeric isocyanurate microbeads 525. A frit 550 serves as a filter at the exit end 555 of the cartridge 510. The microbeads 525 bear a cross-linked homopolymeric isocyanurate surface 530 adapted to separate an analyte from a mixture passed through the cartridge 510. In operation, a liquid mixture may be drawn through the cartridge 510 by the force of gravity or vacuum, or by pressure applied by a syringe or pump. Fittings 535 and 540 are adapted to join the interior 520 with a fluid train for delivering the mixture and receiving eluent. The wall 515 illustratively is a cylinder of glass, polyethylene, polypropylene or stainless steel.

With reference to FIG. 6, yet another illustrative embodiment of the invention comprises a solid-phase extraction cartridge 610. The solid-phase extraction cartridge 610 contains discs 622 to which homopolymeric isocyanurate microbeads 625 are affixed. The discs 622 act as a filter matrix at the exit end 655 of the cartridge 610. The microbeads 625 bear a cross-linked homopolymeric isocyanurate surface 630 adapted to separate an analyte from a mixture passed through the cartridge 610.

Further non-limiting examples of other embodiments include a well plate containing a porous monolith bearing a cross-linked homopolymeric isocyanurate surface and a solid-phase extraction cartridge containing a porous monolith bearing a cross-linked homopolymeric isocyanurate surface.

EXEMPLIFICATION

Exemplary syntheses of seven cross-linked polymer microbeads (Gel A through gel F), are described below. Five of the gels have a different porosity, as shown in the headings. Homopolymer gels based on two different isocyanurate monomers have been prepared. One skilled in the art will recognize that the syntheses can be adapted to prepare a variety of homopolymeric microbeads using different starting isocyanurate monomers, different initiators, different porogens, oxidizing agents, and suspension agents, for example.

We prepared the following microbeads over a three-day period. The table below shows the average porosity in angstroms for the microbeads of five different preparations: Gel A: 500 angstrom (Å) porosity; Gel B: 1000 angstrom (Å) porosity; Gel C: 10,000 angstrom (Å) porosity; Gel D: 100,000 angstrom (Å) porosity; Gel E: substantially non-porous, and Gel F: 1000 angstrom (Å) porosity.

On Day 1, we prepared the aqueous phase and organic phase for each gel in the proportions shown in the table below. We dissolved 15.4 grams (g) of METHOCEL™ in 405 milliliters (ml) of hot deionized water (about 70 degrees Celsius) with stirring. Then we added 375 ml of room temperature (ambient, about 25 degrees Celsius) deionized water. Next, we added 1.2 ml of concentrated ammonium hydroxide to expand the suspension agent. For the organic phase we mixed the porogens, for example, toluene and dodecanol, with 140 ml of the monomer, 1,3,5-triallyl-1,3,5-triazine-2,4,6 (1H, 3H,5H)-trione. It should be noted that any other hydrophobic, organic solvents would work in place of toluene and dodecanol. With constant, high shear stirring, we added 8 g of the initiator 2,2'-azobis(2-methylbutyronitrile), commercially available as VAZO-67™ (Dow Chemical Company). During the high shear stirring, small droplets, essentially homogeneous in size, were formed for polymerization. The droplets were typically of a diameter ranging from about 2 microns to about 20 microns, with droplets of about 5 microns diameter predominating in the mixture. In preparing Gel E, Solid Bead, we omitted the porogens.

| Gel A: 500 Angstrom (Å) Porosity | |
|---|---|
| Aqueous Phase | 405 ml Hot deionized H$_2$O |
| | 15.4 g METHOCEL ™ (Dow) |
| | 0.024 g K$_2$Cr$_2$O$_7$ |
| | 375 ml ambient deionized H$_2$O |
| | 1.2 ml NH$_4$OH (15M) |
| Organic Phase | 72 ml Toluene |
| | 72 ml Dodecanol |
| | 140 ml triallylisocyanurate |
| | 8 g VAZO-67 ™ |

| Gel B: 10$^3$ Angstrom (Å) Porosity | |
|---|---|
| Aqueous Phase | 405 ml Hot deionized H$_2$O |
| | 15.4 g METHOCEL ™ (Dow) |
| | 0.024 g K$_2$Cr$_2$O$_7$ |
| | 375 ml ambient deionized H$_2$O |
| | 1.2 ml NH$_4$OH (15M) |
| Organic Phase | 72 ml Dodecanol |
| | 72 ml Cyclohexane |
| | 140 ml triallylisocyanurate |
| | 8 g VAZO-67 ™ |

| Gel C: 10$^4$ Angstrom (Å) Porosity | |
|---|---|
| Aqueous Phase | 405 ml Hot deionized H$_2$O |
| | 15.4 g METHOCEL ™ (Dow) |
| | 0.024 g K$_2$Cr$_2$O$_7$ |
| | 375 ml ambient deionized H$_2$O |
| | 1.2 ml NH$_4$OH (15M) |
| Organic Phase | 108 ml Dodecanol |
| | 36 ml Cyclohexane |
| | 140 ml triallylisocyanurate |
| | 8 g VAZO-67 ™ |

| Gel D: 10$^5$ Angstrom (Å) Porosity | |
|---|---|
| Aqueous Phase | 405 ml Hot deionized H$_2$O |
| | 15.4 g METHOCEL ™ (Dow) |
| | 0.024 g K$_2$Cr$_2$O$_7$ |
| | 375 ml ambient deionized H$_2$O |
| | 1.2 ml NH$_4$OH (15M) |
| Organic Phase | 122.4 ml Dodecanol |
| | 21.6 ml Cyclohexane 205 |
| | 140 ml triallylisocyanurate |
| | 8 g VAZO-67 ™ |

| Gel E: Solid Bead | |
|---|---|
| Aqueous Phase | 405 milliliters (ml) Hot deionized H$_2$O |
| | 15.4 gram (g) K100 |
| | 0.024 g K$_2$Cr$_2$O$_7$ |
| | 375 ml ambient deionized H$_2$O |
| | 1.2 ml NH$_4$OH |
| Organic Phase | 284 ml triallylisocyanurate |
| | 8 g VAZO 67 |

| Gel F: Tris-hydroxyethyl Isocyanuarate Triacrylate Bead | |
|---|---|
| Aqueous Phase | 1370 milliliters (ml) Hot deionized H$_2$O |
| | 38.5 gram (g) K100 |
| | 0.060 g K$_2$Cr$_2$O$_7$ |
| | 1250 ml ambient deionized H$_2$O |
| | 3.0 ml NH$_4$OH |
| Organic Phase | 360 ml toluene |
| | 350 g Tris-hydroxyethyl isocyanurate triacrylate |
| | 20 gm Vazo 67 |

Once a substantially homogeneous droplet size was reached, the mixture was heated to about 70 degrees Celsius for approximately 12 hours to polymerize the suspension.

On day two, we added 150 ml methanol and 50 ml concentrated nitric acid to each reaction vessel containing the suspension polymerization mixture with constant, gentle stir speed. We heated the mixture in an approximately 70 degree Celsius water bath for about 24 hours.

On day three, we vacuum-filtered the contents of the vessel through a fine gauge Buchner funnel. Then we washed the gel residue in about 300 ml acetone for about one-half hour, and vacuum-filtered the residue through a Buchner funnel. Then we repeated the acetone-wash for one-half hour and filtered again.

Next, with constant, gentle stirring, we added an additional 300 ml of acetone and an additional 24 grams of VAZO-67™ initiator to the washed gel residue.

We allowed the acetone to evaporate off the gel residue in a fume hood with constant, gentle stirring. Results: The gel residue formed partially cross-linked isocyanurate homopolymer microbeads coated with the VAZO-67™ on the total surface, that is, the outside surface of the microbeads and the inside surface of the pores of the microbeads.

Then we allowed the gel to harden in a vacuum oven, which excluded air, at a temperature of about 70 to 75 degrees Celsius overnight. Results: The gel residue hardened and the VAZO-67™ initiator coating the total surface of the microbeads decomposed, leaving cross-linked isocyanurate homopolymer microbeads without the coating.

EQUIVALENTS

Although specific features of the invention are included in some embodiments and drawings and not in others, it should be noted that each feature may be combined with any or all of the other features in accordance with the invention.

It will therefore be seen that the foregoing represents a highly advantageous approach to the polymerization of isocyanurate homopolymers, especially for use in separation techniques. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A composition in the form of a cross-linked isocyanurate homopolymer in the form of a porous microbead,
    wherein the homopolymer is a homopolymer of the isocyanurate monomer 1,3,5-triallyl-1,3,5-triazine-2,4,6 (1H, 3H, 5H)-trione having the structural formula:

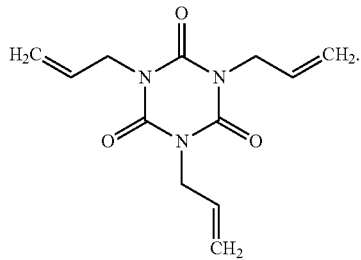 [SMILES: C=CCn1c(=O)n(CC=C)c(=O)n(CC=C)c1=O]

2. The composition of claim 1, wherein the microbead has an average diameter of from about 1 micron to about 200 microns.

3. The composition of claim 1, wherein the average pore size has a diameter from about 1 angstrom to about 1,000,000 angstroms.

4. The composition of claim 1, wherein the microbead is formed from a suspension homopolymerization of the isocyanurate monomer.

5. The composition of claim 4, wherein the homopolymerization is initiated by a free-radical initiator.

6. The composition of claim 1, wherein the microbead is formed by a method comprising the following steps:
    A) preparing an organic solvent comprising the isocyanurate monomer and one or more porogens to form an organic phase, the organic phase being immiscible with water;
    B) preparing an aqueous solvent comprising water to form an aqueous phase, the aqueous phase being immiscible with the organic phase;
    C) mixing the organic phase with the aqueous phase to form a suspension of droplets of the organic phase in the aqueous phase;
    D) causing the homopolymerization of the isocyanurate monomer in the suspension of droplets by activating a first free-radical type initiator to convert the droplets to microbeads of the cross-linked homopolymer;
    E) separating the microbeads from the aqueous phase to form separated microbeads;
    F) mixing the separated microbeads with an organic solvent containing a second free-radical type initiator;
    G) evaporating the organic solvent to leave the separated microbeads with a coating of the second free-radical type initiator to form second initiator-coated microbeads;
    H) substantially completing the homopolymerization of the second initiator-coated microbeads by maintaining the microbeads in an oxygen-free environment to form hardened microbeads.

7. The composition of claim 6, wherein the aqueous phase contains a suspension promoter.

8. The composition of claim 6, wherein the hardened microbeads are useful in the stationary phase of chromatographic devices.

9. The composition of claim 6, wherein the first free-radical type initiator and the second free-radical type initiator are identical.

* * * * *